(No Model.) 2 Sheets—Sheet 1.

J. W. FUGATE.
IMPLEMENT FOR DEHORNING CATTLE.

No. 406,208. Patented July 2, 1889.

WITNESSES:
J. H. Clark.
C. Sedgwick.

INVENTOR
J. W. Fugate
BY
Munn & Co.
ATTORNEY (No Model.) 2 Sheets—Sheet 2.
J. W. FUGATE.
IMPLEMENT FOR DEHORNING CATTLE.
No. 406,208. Patented July 2, 1889.
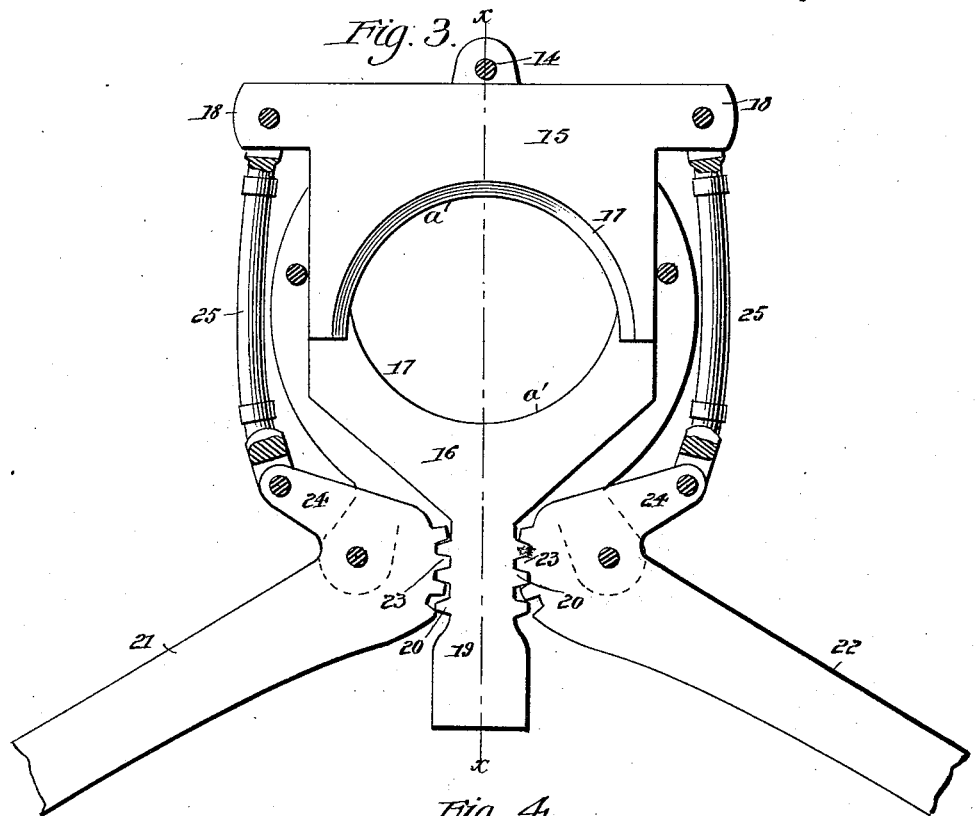
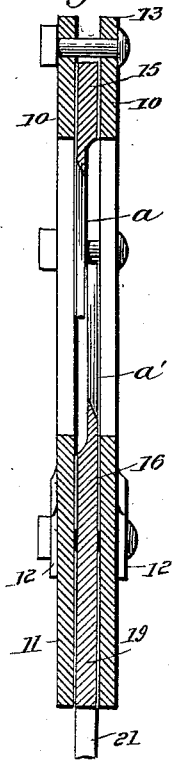
WITNESSES:
INVENTOR
BY
ATTORNEY

UNITED STATES PATENT OFFICE.

JEROME W. FUGATE, OF LAWRENCE, KANSAS.

IMPLEMENT FOR DEHORNING CATTLE.

SPECIFICATION forming part of Letters Patent No. 406,208, dated July 2, 1889.

Application filed March 22, 1889. Serial No. 304,281. (No model.)

*To all whom it may concern:*

Be it known that I, JEROME W. FUGATE, of Lawrence, in the county of Douglas and State of Kansas, have invented a new and useful Improvement in Implements for Dehorning Cattle, of which the following is a full, clear, and exact description.

My invention relates to an improved implement for dehorning cattle, and has for its object to provide a device of simple, durable, and economical construction, wherein two semicircular blades may be so controlled by the operator that in the operation of dehorning both blades will contact with the horn at the same time, and cut simultaneously in a circular form with a shearing movement, thereby producing a rapid, clean, and positive cut.

The invention consists in the novel construction and combination of the several parts, as will be hereinafter more fully set forth, and pointed out in the claims.

Reference is to be had to the accompanying drawings, forming a part of this specification, in which similar letters and figures of reference indicate corresponding parts in all the views.

Figure 1:
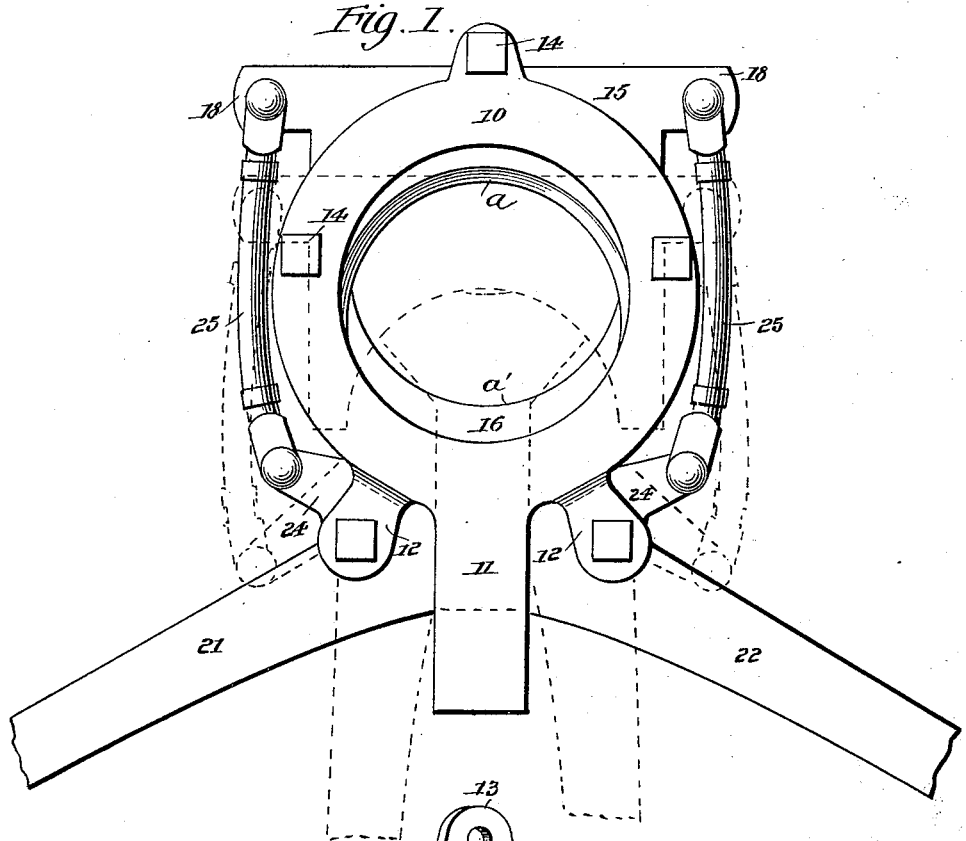
Figure 2:
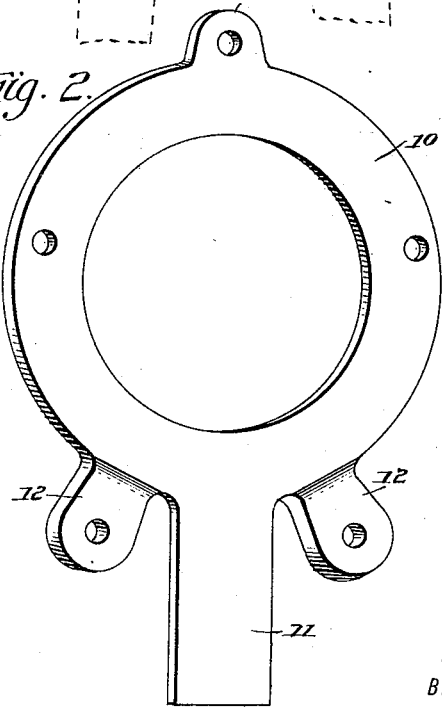

Figure 1 is a side elevation of the implement, illustrating the knives as opened to receive the horn, in positive lines, and as closed to sever the horn, in dotted lines. Fig. 2 is a side elevation of a detached portion of the shell or frame. Fig. 3 is a horizontal vertical section taken between one outer plate of the frame and the opposed face of the cutters, and Fig. 4 is a central transverse section on line *x x* of Fig. 3.

In carrying out the invention, the frame of the implement is preferably circular in general contour, consisting of two spaced rings 10, provided with a tongue or shank 11, projected vertically downward from the lower peripheral edge at the center, and a lug 12 at each side of the said tongue or shank, as best illustrated in Fig. 2. The rings 10 are also preferably provided at the upper edge with a lug 13, and the frame is formed by connecting the two opposed rings by bolts 14, passed through each ring at the side, and also through the upper lug 13, as best shown in Figs. 1 and 3. Between the two rings of the frame an upper cutter 15 is held to slide upon a lower cutter 16, as shown in Fig. 3, and likewise in Fig. 4. In the lower edge of the upper cutter and in the upper edge of the lower cutter a semicircular recess 17 is produced, one wall of each recess being beveled to form opposed cutting-edges *a* and *a'*. The bevel in the upper cutter is upon the opposite side to the bevel in the lower cutter. The arc of the circle in the cutting-surface of each of the cutters is such that when the two cutters are drawn their farthest distance apart the two opposed cutting-edges will constitute, essentially, a complete circle, which circle is narrowed and made to approximate an oval as the cutting-edges of the cutters are made to approach one another.

The upper cutter 15 at each upper corner is provided with a horizontal integral arm 18, which arms project beyond the frame, and from the center of the lower edge of the lower cutter 16 a shank 19 is downwardly projected between the shanks 11 of the frame, the said cutter-shank having produced in each side a series of teeth 20, as best shown in Fig. 3.

Upon each of the lugs 12 of the frame a lever 21 and 22 is respectively pivoted, the head of which levers is provided upon the inner edge with teeth 23, adapted to mesh with the teeth 20 of the lower cutter-shank. Thus by drawing the two levers 21 and 22 downward to approach one another the lower cutter 16 is elevated, and in order to lower the upper cutter simultaneously with the lower cutter a downwardly-extending horn 24 is formed integral with the outer upper edge of the said lever-heads, which horns are pivotally connected with the arms 18 of the upper cutter by pitmen 25, which pitmen are preferably slightly bowed outward. Thus in operation when the levers 21 and 22 are carried their farthest distance apart, as illustrated in positive lines in Figs. 1 and 3, the upper and lower cutters are brought in position to receive the horn to be cut. The horn having been introduced between the cutting-edges of the cutters 15 and 16, the handles of the levers 21 and 22 are carried downward to approach each other, whereupon the toothed engagement of the cutter-heads with the lower cutter elevates the same, and as the horns 24 of the levers are carried downward, as shown in dotted lines in Fig. 1, by reason of the pitman-connection 25, the upper cutter is brought downward a distance corresponding to the upward movement of the lower cutter. Thus as the cutters move the same distance at the same time in opposite directions, they contact simultaneously with the horn, and as they are forced in or through the same they cut upon all sides, leaving the stump of the horn perfectly smooth and free from checks.

Having thus described my invention, I claim as new and desire to secure by Letters Patent—

1. In a dehorning implement, the combination, with a frame having a circular opening therein, of an upper and a lower cutter held to slide one upon the other in opposite directions and having semicircular cutting-edges, and means, substantially as shown and described, for simultaneously manipulating the said cutters, as and for the purpose specified.

2. The combination, with a frame provided with a central opening, and an upper and a lower cutter held to slide one upon another within the said frame, provided with opposed concaved cutting-edges, of levers contacting with the lower cutter and capable of moving the same, and a pitman-connection between said levers and the upper cutter, all combined for operation substantially as shown and described.

3. The combination, with a frame provided with a central opening, and an upper and a lower cutter held to slide one upon the other within the said frame, provided with opposed concaved cutting-edges, of levers having a toothed head capable of contact with the lower cutter, a horn projected from the said lever-heads, and a pitman-connection between the said horns and the upper cutter, substantially as shown and described.

4. The combination, with a frame provided with a central opening, and an upper and a lower cutter held to slide within the said frame provided with opposed semicircular cutting-edges, the lower cutter having integral therewith at the bottom a downwardly-extending shank provided with toothed side edges, of levers fulcrumed within the frame having a toothed head capable of contact with the teeth of the lower cutter, and a pitman-connection between said heads of the levers and the upper cutter, all combined for operation substantially as and for the purpose specified.

5. The combination, with a frame consisting of two spaced united rings having a shank integral with the lower periphery at the center, and a lug at each side of the said shank, an upper and a lower cutter held to slide one upon the other between the rings, provided with opposed concaved cutting-edges, and a shank integral with the lower edge of the lower cutter at the center, having teeth produced in each side edge, of a lever fulcrumed upon the lugs of the rings provided with a head having teeth meshing with the teeth of the lower cutter, a horn outwardly projected from the upper portion of the said lever-heads, and a pitman-connection between the said horns and the upper end of the upper cutter, all combined for operation substantially as shown and described, and for the purpose specified.

JEROME W. FUGATE.

Witnesses:
J. G. LOVE,
A. G. HONNOLD.